United States Patent [19]

Skibinski

[11] Patent Number: 4,596,297

[45] Date of Patent: Jun. 24, 1986

[54] COMPRESSIVE LOAD-BEARING ELECTRICAL ISOLATOR FOR LOAD CELL

[75] Inventor: Robert E. Skibinski, Columbus, Ohio

[73] Assignee: Thurman Manufacturing Co., Columbus, Ohio

[21] Appl. No.: 661,596

[22] Filed: Oct. 17, 1984

[51] Int. Cl.⁴ .................. G01G 19/00; G01G 19/52; G01G 21/28

[52] U.S. Cl. ................. 177/132; 177/244; 177/245; 174/2; 174/138 D

[58] Field of Search ............... 174/2, 138 D, 138 B, 174/50.56; 177/184, 244, 245, 253, DIG. 9, 132

[56] References Cited

U.S. PATENT DOCUMENTS

| | | |
|---|---|---|
| 2,196,428 | 4/1940 | Saurer . |
| 2,235,429 | 3/1941 | Henry et al. ............ 174/50.56 |
| 2,338,109 | 1/1944 | Green . |
| 2,448,766 | 9/1948 | Burke . |
| 2,802,204 | 8/1957 | Kennelly et al. . |
| 3,023,268 | 2/1962 | Preiser et al. .......... 174/50.56 |
| 3,150,298 | 9/1964 | Andres ................ 174/50.56 |
| 3,204,989 | 9/1965 | Wilson . |
| 3,246,843 | 4/1966 | Pineau . |
| 3,792,193 | 2/1974 | Price et al. . |
| 3,917,981 | 11/1975 | Keen .................. 177/245 X |
| 4,275,263 | 6/1981 | Chino ................ 174/138 D X |
| 4,411,325 | 10/1983 | Hamilton ............. 177/DIG. 9 X |

Primary Examiner—E. A. Goldberg
Assistant Examiner—Patrick W. Foster
Attorney, Agent, or Firm—Cushman, Darby & Cushman

[57] ABSTRACT

Incorporated in a tensile member by which a hopper or the like is suspended from a ground-supported frame is an electronic load cell which is constructed and arranged to report to a convenient control location a signal which corresponds to the tension in tensile member as a measure of the weight of the material such as sand, crushed stone, cement or ore in the hopper. In order to prevent lightning which may strike the hopper or support frame from travelling along the tensile member and damaging or destroying the load cell, the tensile member is electrically isolated from both the hopper and the support frame by bushed connectors wherein the insulating bushing portion is stressed in compression. These bushed connectors simultaneously provide this electrical shock isolating function and both carry the static load and accommodate mechanical shock produced upon sudden changes in load, as when a load of stone is dumped into or dispensed from the hopper.

5 Claims, 6 Drawing Figures

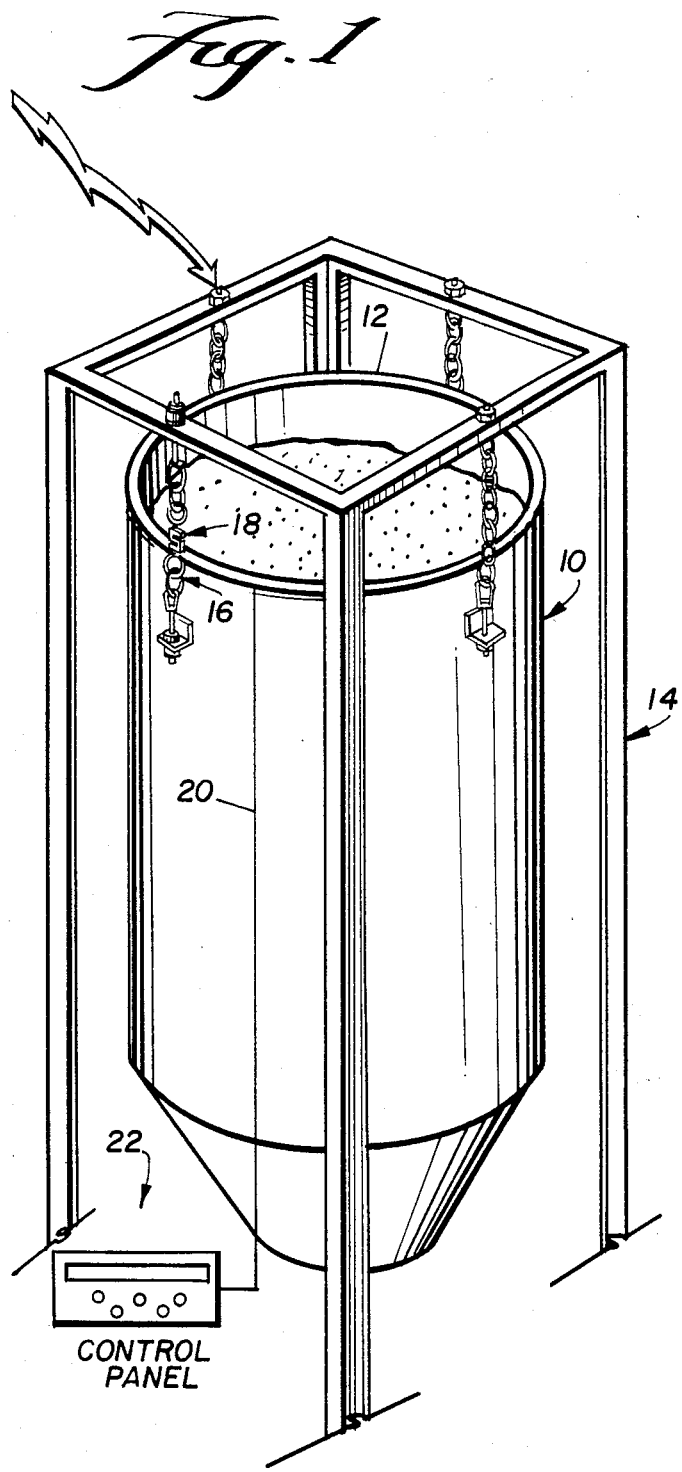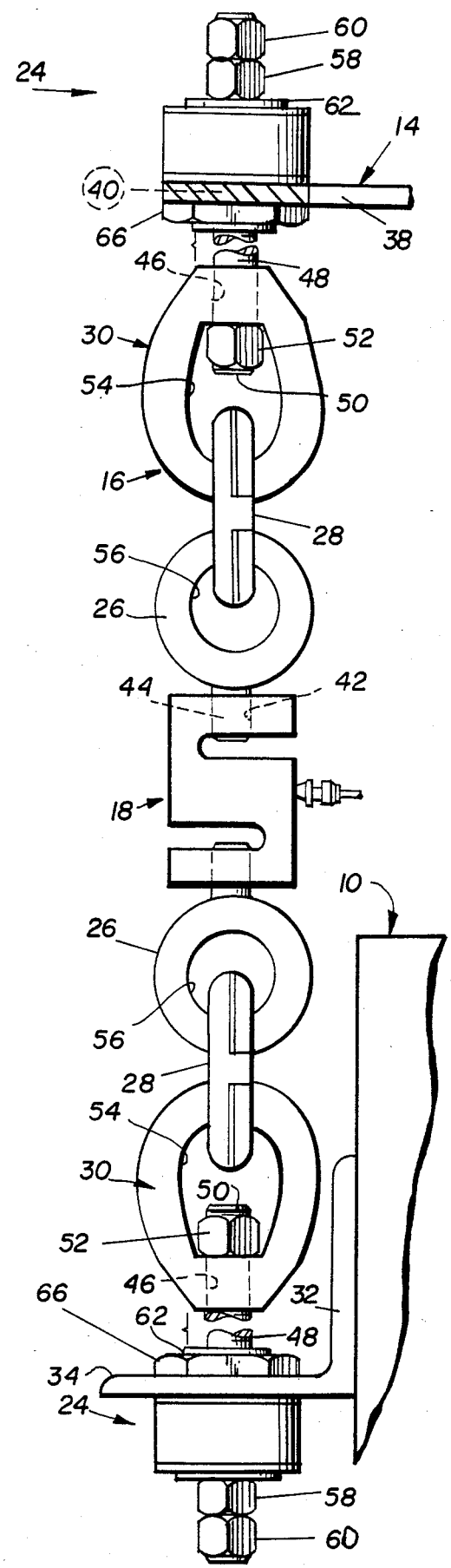

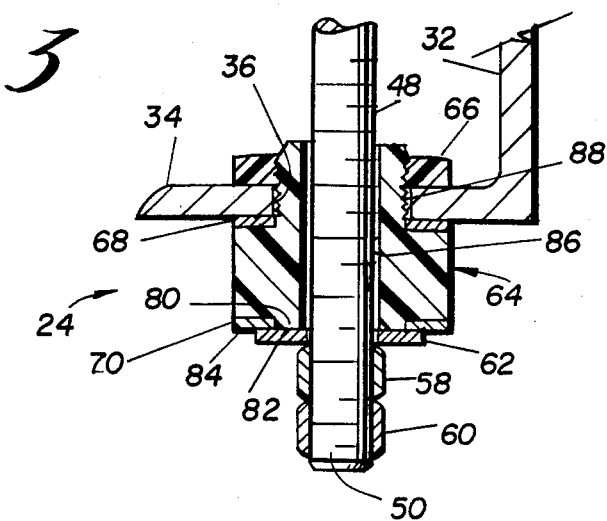
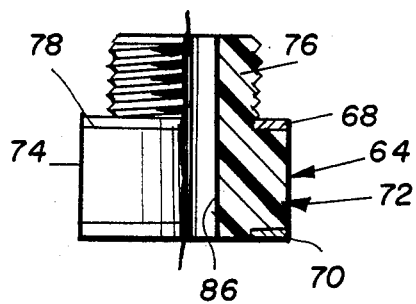
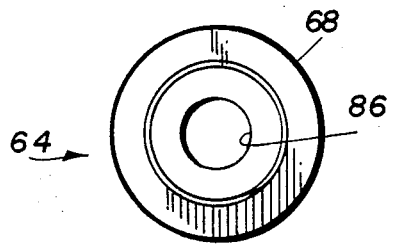
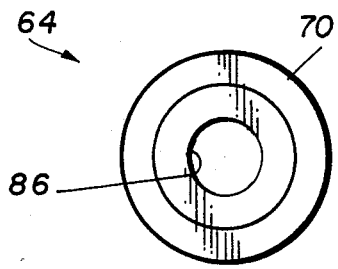

COMPRESSIVE LOAD-BEARING ELECTRICAL ISOLATOR FOR LOAD CELL

BACKGROUND OF THE INVENTION

Throughout the weighing industry, load cells have been found to be susceptible to lightning strikes. This is especially true when the load cell is mounted as the weighing element in a batching operation. The silos used in batching are set up in the open fields and may extend forty feet or more in the air and thus act almost like a lightning rod. When one of these plants get hit by lightning, the load cell is usually ruined. As a result, there have been numerous attempts to install electrical isolators on either side of the load cell. Generally, if not exclusively these prior attempts have used isolators which are mounted in tension. The present invention grew out of a perceived need for an electrical isolator which is stressed in compression rather than in tension, so that it can accept greater loading, yet without necessarily being so expensive.

SUMMARY OF THE INVENTION

Incorporated in a tensile member by which a hopper or the like is suspended from a ground-supported frame is an electronic load cell which is constructed and arranged to report to a convenient control location a signal which corresponds to the tension in tensile member as a measure of the weight of the material such as sand, crushed stone, cement or ore in the hopper. In order to prevent lightning which may strike the hopper or support frame from travelling along the tensile member and damaging or destroying the load cell, the tensile member is electrically isolated from both the hopper and the support frame by bushed connectors wherein the insulating bushing portion is stressed in compression. These bushed connectors simultaneously provide this electrical shock isolating function and both carry the static load and accommodate mechanical shock produced upon sudden changes in load, as when a load of stone is dumped into or dispensed from the hopper.

The principles of the invention will be further discussed with reference to the drawings wherein a preferred embodiment is shown. The specifics illustrated in the drawings are intended to exemplify, rather than limit, aspects of the invention as defined in the claims.

BRIEF DESCRIPTION OF THE DRAWINGS

In the drawings:

FIG. 1 is a small scale perspective view of a frame-suspended hopper, wherein one of the tensile members used for suspending the hopper from the frame has incorporated therein an electronic load cell which is electrically isolated from both the hopper and the frame using respective electrical isolators which are constructed and arranged in accordance with principles of the present invention;

FIG. 2 is a larger scale fragmentary side elevation view thereof;

FIG. 3 is a fragmentary longitudinal sectional view showing internal details of the lower one of the electrical isolators as representative of both of them, and illustrating the interconnection formed thereby between the tensile member and the supporting frame;

FIG. 4 is a side elevation view, with the right half in longitudinal section, of the lower isolator;

FIG. 5 is a top plan view thereof; and

FIG. 6 is a bottom plan view thereof.

DETAILED DESCRIPTION

Quite frequently in a large scale batching operation, e.g. where a plurality of ingredients must be combined in a predetermined proportion or where some payment or other transfer of value is to be based upon the mass of a commodity which is transferred in one quantum, e.g. from a storage facility to a transportation device, from one storage facility to another, from one transportation device to another, from a transportation device to a storage facility, or between a storage facility or transportation device and a batching reservoir, it becomes necessary to monitor or measure the mass of the quantum and/or the quantums of the ingredients which are being combined.

In a typical such operation, at a field site located near a large construction project, at least one and usually several silo-like or elevator-like storage towers are grouped about a frame-suspended hopper 10. A gated chute, endless conveyor or similar valved or otherwise controllable transfer device connects the outlet of each storage tower with the mouth 12 or other inlet of the frame-supported hopper. As a batch or other quantum of material is being made-up, e.g. according to an order or according to a set formula, the respective transfer devices from the storage towers are serially operated while the quantity transferred from each to the frame-suspended hopper 10 is monitored.

To that end, there is customarily provided between the frame suspended hopper 10 and its ground-supported suspending frame 14, e.g. in each of one or more of the tensile members 16 which hangingly support the hopper 10 from the frame 14, a respective weighing device 18.

Conventionally, the or each weighing device 18 includes or is served by a means 20 for instantaneously reporting the weight or change in weight sensed by the device 18 to a conveniently located control station 22. The reporting means conventionally may comprise a transmitter and receiver, electrical wiring or the like. At the control station 22, the weighing device 18 via the reporting means 20 may simply provide a reading which is monitored by a human operator who pushes buttons, operates levers or sends signals to cause opening and closing or starting and stopping of the respective storage tower transfer devices. Or, in a more elaborate installation, the operator may be provided at the control station 22 with a computer terminal which he or she can program or operate to cause automated operation of the transfer devices in response to signals from the weighing device 18, for precision formulation of batches and other quantums.

Whereas for many years mechanical weighing devices have been used as the weighing devices for such hoppers, in recent times, electronic scales, e.g. strain gauges mounted to a mechanical link and incorporated in a bridge circuit have come to replace purely mechanical weighing device for this as well as many other weighing applications. Although the advantages thereby gained are so strongly felt and well-known in the art that they need not be recounted here, the use of electronic scales in such an application can entail a significant disadvantage, that of susceptibility to damage by lightning in the event of an electrical storm.

The problem stems from the fact that the hoppers and their supporting frames often are set in fields where they are the tallest objects in the vicinity and therefore are attractive sites for lightning strikes. The hoppers 10, frames 14 and suspending tensile members 16 usually are made largely if not entirely of electrically conductive material.

Should lightning strike during an electrical storm cause a surge of electrical power travelling along the hopper or frame to pass to the frame or hopper along the tensile member 16 carrying an electronic-type weighing device 18, in all probability the weighing device 18 would be damaged, perhaps beyond repair.

Accordingly, others have proposed electrically insulating isolator devices constructed and arranged for incorporation in the tensile members 16 in which the electronic-type weighing devices 18 are provided. However, in most instances the designs of isolator heretofore proposed are designed to be stressed in tension while in use, with a consequence that they are subject to mechanical failure, e.g. when a heavy load of rock or the like is suddenly dumped into the hopper. Further, prior designs have caused weight and loading restrictions to be placed on the hoppers.

According to the present invention, there is provided in or between each of the tensile members 16 in which an electronic-type weighing device is incorporated, and both the suspending frame 14 and the suspended hopper 10, respectively, novel electrically insulating isolators 24, which are designed to be loaded in compression and to avoid the structural weaknesses to which prior art isolators have been subject.

In FIG. 2, a tensile member 16 is shown incorporating an electronic load cell type of weighing device 18 and being connected between a frame-suspended hopper 10 and a suspending frame 14. More particularly, the tensile member 16 is shown comprising a plurality of interconnected links including eyebolts 26, missing links 28 and eye nuts 30, these latter elements directly connecting with the isolators 24 in the instance depicted.

The hopper is shown being provided with an angle member 32 integrally having a vertical flange securely mounted on the hopper side near the hopper mouth, e.g. by welding or bolting, and, cantilevered out from the hopper side, a generally horizontal flange 34 which is provided with a slot or opening 36 vertically through its thickness.

The suspending frame 14 is shown including a generally horizontally extending flange 38 of a superstructure member, which likewise is provided with a slot or opening 40 through its thickness.

An upper isolator 24 is shown connecting the upper end of the tensile member 16 to the frame superstructure member flange 38 through the opening 40, and a lower isolator 24 is shown connecting the lower end of the tensile member 16 to the hopper mounting angle horizontal flange 34 through the opening 36. By preference, these two isolators 24 are identical to one another in structure, but one is used in an inverted condition relative to the other.

FIGS. 3-6 are used for further describing the isolators 24, using the lower one as an example of both of them (and of the others, should the hopper 10 be provided with more than one tensile member 16 having a weighing device 14 incorporated therein).

Briefly, in the instance depicted, the generally S-shaped body of the load cell 18 is provided at the top and bottom with respective vertically oriented, internally threaded openings 42 in which the externally threaded stems 44 of the eyebolts 26 are threadedly secured. Each eye nut 30 has an opening 46 provided vertically through it at its base, which opening receives the externally threaded shank 48 of an all thread hanger 50 made of a usual metal for such hardware, e.g. galvanized steel. A respective nut 52 threadedly secured on the inner end of the respective hanger 50 prevents that hanger from pulling out of the respective eye nut. The ring 54 of each eye nut is shown connected with the ring 56 of the respective eye bolt 26 by being linked by a respective missing link 28. The latter device is a well-known conventional hardware item which is used, among other uses, as a repair link for reconnecting two segments of chain when a link has been broken and removed. In general, it usually includes two complementary portions which can be assembled and secured together to provide a link.

In instances where the tensile member 16 must be longer than shown, additional chain links or the like may be provided.

For ease of description, a generally vertical direction extending along the tensile member towards the load cell 18 will be designated "inwards" and the opposite direction will be designated "outwards". Thus, the shank of each all thread hanger 50 is projected outwards through the hole 36 or 40 in the respective flange 34 or 38, and a nut and lock nut 58 and 60 are threadedly secured thereon, e.g. behind a metal washer 62. If this were all there were to the structure, a conductive path for electricity would be provided between the hopper and the tensile member, and between the tensile member and the supporting frame. The two isolators 24 interrupt such a path at their respective locations.

Each isolator 24 is shown including an isolator body 64, a preferred embodiment of which is shown by itself in FIGS. 4-6, and a positioning nut 66, shown assembled to the respective body in FIGS. 2 and 3.

Each isolator body 64 preferably is an annular element preferably molded of an electrically insulating material such as fiberglass-reinforced polyester, e.g. polyethylene terepthalate, having two metal, e.g. galvanized steel cap washers 68, 70 partially embedded therein so as to be coaxial with one another and with the plastic portion 72 of the isolator body. Other materials such as alumina, boron nitride and fiber reinforced rubber could be used to make the isolator body, and the stress-spreading washer-like elements could be made of other materials such as rubber, a plastic such nylon 6 or polyethylene terephthalate.

Each isolator body is shown having two axially adjoining barrel portions 74, 76, of which the axially outer one 74 is of a larger diameter than the other. One of the cap washers 68 is partially embedded so as to plate the step or shoulder 78 between the two barrel portions, and the other one, 70, is partially embedded so as to plate the axially outer end of the axially outer barrel portion 74, except that, medially, an integral ring 80 of the plastic material of the body lines the bore of the washer 70. Accordingly, the axially outer end surface 82 of the ring 80 of the plastic portion 72 of the body 64 preferably is substantially flush with the axially outer end surface 84 of the washer 70. A throughbore 86 extends axially centrally through the plastic portion 72 of the body. Its internal diameter is slightly larger than the external diameter of the shank of the respective all thread hanger. The smaller diameter, axially inner barrel portion of the plastic portion of the body 64 is externally threaded, as at 88. The axial inward extent of the smaller diameter barrel portion, beyond the washer 68, is greater than the thickness of the respective flange 34 or 38 perimetrically of the respective hole 36 or 40 and the outer diameter thereof is slightly smaller than the inner diameter of the respective hole 36 or 40. Accordingly, the isolator bodies 64 may be assembled to the respective flanges 34 and 38 as shown, with the smaller diameter barrel portions protruding axially inwardly through, and thus lining the respective holes 36 and 40, whereupon the positioning nuts 66, may be threaded thereon. The, positioning nuts may be made, e.g. of galvanized steel for example, of any of the materials of which the isolator bodies or the cap washers are made.

Then the all thread hangers may be installed through the isolators 24, as shown.

As a practical matter, because the structures shown are so modular and may be conveniently assembled and disassembled at more than one site, the order of assembly and disassembly steps is largely optional.

In any event, the present invention provides, in effect, an electrically insulative grommet between electrically conductive parts of the hopper 10 and the tensile member 16, and another between electrically conductive parts of the frame 14 and the tensile member 16, for isolating the weighing device 18 from the effects of lightning which may strike the hopper or the support frame. This electrically insulative grommet is primarily stressed in compression, with the compression being spread across relatively large annular portions of the opposite ends of the larger diameter barrel portion of each insulative grommet by the respective sandwiching cap washers 68 and 70. Thus, an inexpensive, yet effective solution to a persisting problem is provided.

It should now be apparent that the compressive load-bearing electrical isolator for load cell incorporated in mechanical suspension for batch process silo, or similar device as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. An electrical storm surge-protected, frame-supported electronic weighing hopper, comprising:
    a ground-engaging hopper-suspending frame, having a horizontal flange means fixed thereto;
    a hopper for fluent material, having a horizontal flange means fixed thereto;
    a two-ended mechanical suspension element constructed and arranged to be connected between said horizontal flange means of said frame and said hopper for suspending said hopper from said frame;
    said mechanical suspension element incorporating an electrical surge-sensitive electronic weighing device therein between the two ends thereof;
    means mechanically connecting each end of said mechanical suspension element to a respective one of said flange means;
    as to at least one of said flange means, this flange means having an opening formed generally vertically through the thickness thereof, said mechanical suspension element includes at a respective end thereof an axially-oriented shank having a substantially smaller diameter than said opening, an enlargement means provided on an axially outer end of said shank, this enlargement means providing an axially inwardly facing shoulder for said shank, and the respective said mechanically connecting means being constituted by an electrical isolator, comprising:
        an annular isolator body made of electrical insulation material, said annular isolator body having two axially adjoining barrel portions, including an axially inner barrel portion having an outer diameter sized to fit in and through said opening, and an axially outer barrel portion having an external width which is substantially greater than the width of said opening, thereby defining an axially inwardly facing shoulder on said axially outer barrel portion adjacent said axially inner barrel portion;
        an axial throughbore formed in said annular isolator body, said axial throughbore opening at opposite ends of said annular isolator body and being circumferentially surrounded by said electrical insulation material, said throughbore being sized to permit said shank to be inserted therethrough;
        two stress-spreading washer means, one coaxially provided on said axially outer barrel portion flush with the axially outer end thereof and the other coaxially provided on said axially outer barrel portion against said axially inwardly facing shoulder;
        said axially inner barrel portion of said isolator body being of sufficient axial extent relative to the thickness of said flange means perimetrically of said opening therethrough, that when said axially inner barrel portion of said isolator is inserted axially inner end first through said opening until the respective one of said washer means engages said flange means perimetrically of said opening, an axially innermost segment of said axially inner barrel portion protrudes axially inwardly beyond said flange means; and
        this axially innermost segment of said axially inner barrel portion is provided with means for fixing thereto of a securement member for engagement with an axially inner face of said flange means for securing said electrical isolator in place as a compressively loaded, insulative grommet for said opening.

2. The electrical storm surge-protected, frame-supported electronic weighing hopper of claim 1, wherein:
    said annular isolator body is integrally molded of synthetic plastic resin.

3. The electrical storm surge-protected, frame-supported electronic weighing hopper of claim 2, wherein:
    at least one of said stress-spreading washer means is partially embedded in said synthetic plastic resin so as to form a unitary part with said annular isolator body.

4. The electrical storm surge-protected, frame-supported electronic weighing hopper of claim 1, wherein:
    said means for fixing a securement member to said axially innermost segment of said axially inner barrel portion of said annular isolator body comprises a band of external helical threading; and
    said electrical isolator further comprises an internally threaded positioning nut as said securement member.

5. The electrical storm surge-protected, frame-supported electronic weighing hopper of claim 1, wherein:

as to the other of said flange means, this flange means having an opening formed generally vertically through the thickness thereof, said mechanical suspension element includes at a respective end thereof an axially-oriented shank having a substantially smaller diameter than said opening, an enlargement means provided on an axially outer end of said shank, this enlargement means providing an axially inwardly facing shoulder for said shank, and the respective said mechanically connecting means being constituted by an electrical isolator, comprising:

an annular isolator body made of electrical insulation material, said annular isolator body having two axially adjoining barrel portions, including an axially inner barrel portion having an outer diameter sized to fit in and through said opening, and an axially outer barrel portion having an external width which is substantially greater than the width of said opening, thereby defining an axially inwardly facing shoulder on said axially outer barrel portion adjacent said axially inner barrel portion;

an axial throughbore formed in said annular isolator body, said axial throughbore opening at opposite ends of said annular isolator body and being circumferentially surrounded by said electrical insulation material, said throughbore being sized to permit said shank to be inserted therethrough;

two stress-spreading washer means, one coaxially provided on said axially outer barrel portion flush with the axially outer end thereof and the other coaxially provided on said axially outer barrel portion against said axially inwardly facing shoulder;

said axially inner barrel portion of said isolator body being of sufficient axial extent relative to the thickness of said flange means perimetrically of said opening therethrough, that when said axially inner barrel portion of said isolator is inserted axially inner end first through said opening until the respective one of said washer means engages said flange means perimetrically of said opening, an axially innermost segment of said axially inner barrel portion protrudes axially inwardly beyond said flange means; and this axially innermost segment of said axially inner barrel portion is provided with means for fixing thereto of a securement member for engagement with an axially inner face of said flange means for securing said electrical isolator in place as a compressively loaded, insulative grommet for said opening.

* * * * *